June 30, 1959  W. W. PARSONS  2,892,639
TRAILER STABILIZER
Filed March 8, 1957
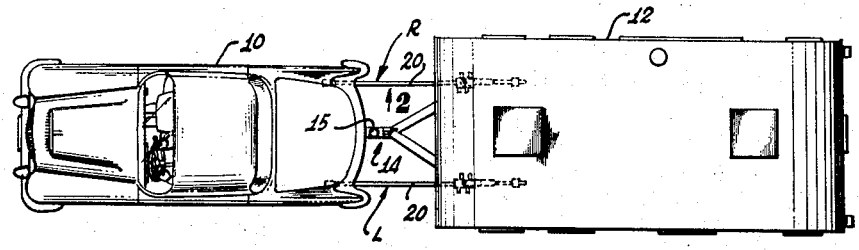
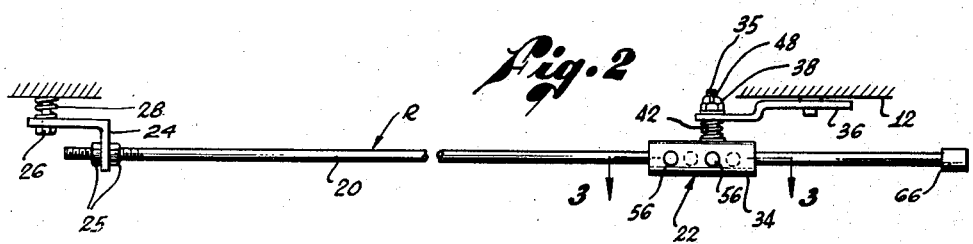
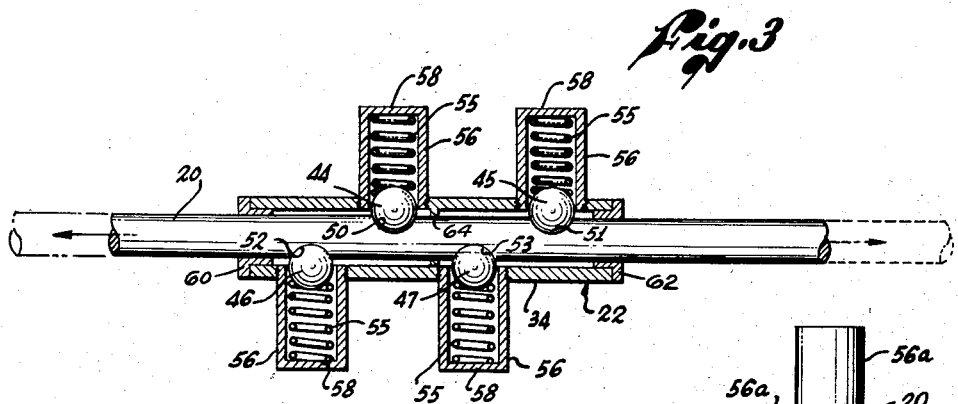
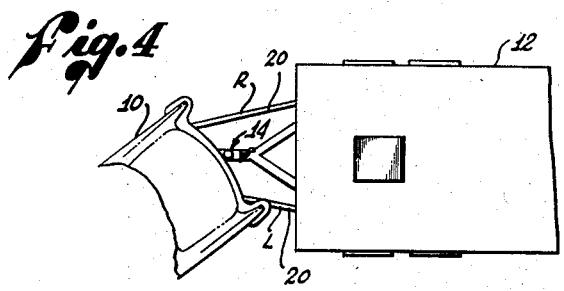
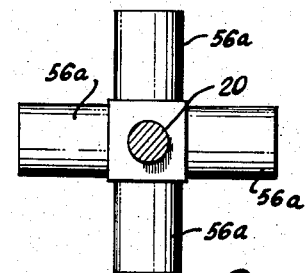
INVENTOR.
WALTER W. PARSONS
BY
Attorney United States Patent Office 2,892,639
Patented June 30, 1959

2,892,639

TRAILER STABILIZER

Walter William Parsons, Montebello, Calif.

Application March 8, 1957, Serial No. 644,906

8 Claims. (Cl. 280—460)

This invention relates to means for coupling a trailer to an automotive vehicle in a manner to stabilize the trailer against oscillating movement out of longitudinal alignment with the automotive vehicle when the trailer is being towed on a substantially straight roadway.

The preferred embodiment of the invention comprises stabilizer means which may be sold as an accessory for use with conventional trailer hitches for towing house trailers. This particular embodiment of the invention has been selected for the present disclosure and will provide adequate guidance for those skilled in the art who may have occasion to apply these same principles to the problem of stabilizing any kind of a trailer.

When a house trailer is coupled to an automobile in a simple pivotal manner by a conventional trailer hitch, there is an inherent tendency for the trailer to oscillate or sway in opposite lateral directions when drawn along a straight roadway. The purpose of the present invention is to provide damping means to counteract this tendency.

One cause of trailer sway is the lateral forces transmitted to the trailer from the towing automobile by the trailer hitch. These lateral forces arise from small departures of the automobile from a straight line of travel and often are augmented by the fact that the automobile is yieldingly supported by spring means. The swaying of the trailer from a straight line of travel is especially pronounced whenever the frequency of the lateral forces transmitted thereto from the automobile coincide with the natural frequency of the trailer body on its spring suspension.

Another cause of sway on the part of a trailer is lateral wind pressure. A gusty side wind acts on the automobile to augment the lateral forces that are transmitted to the trailer through the trailer hitch, and also acts on the trailer itself to cause the trailer to oscillate about the trailer hitch. Here again the effect of the engendered sway forces is magnified whenever the frequency of the forces is the natural frequency of the spring-mounted trailer body.

It has been suggested heretofore in the prior art that a trailer may be damped or stabilized against sway action by providing a pair of spring means on opposite sides of the trailer hitch for yielding opposition to departure of the trailer in opposite directions from longitudinal alignment with the leading automobile. Such arrangements do have a stabilizing effect but have a serious inherent disadvantage in that the counteracting force is of minimum magnitude when the trailer is in longitudinal alignment with the automobile. The counteracting force increases progressively with increasing departure of the trailer from normal longitudinal alignment. The rise in resistance with increased departure may seriously interfere with towing the trailer around curves and corners just when maximum freedom of angular movement of the trailer is desirable. A certain dilemma is involved since reducing the force of the spring means for the sake of freedom in the negotiation of curves reduces the damping force that is needed for straight travel.

The present invention solves this dilemma by employing detent means that provides maximum damping force against initial departure of the trailer from normal longitudinal alignment and affords much less resistance to changes of the relative angle of the trailer once the trailer swings out of its normal alignment. The detent means provides direct spring pressure to resist the initial departure but offers only frictional resistance thereafter to continued departure of the trailer from longitudinal alignment.

A feature of the preferred practice of the invention is the incorporation of stop means in the stabilizer structure. As will be explained, this provision enables the stabilizer to keep the trailer hitched to the automobile in the event that the trailer hitch fails while the two vehicles are traveling at high speed.

The various features and advantages of the invention will be readily understood from the following detailed description considered with the accompanying drawing.

In the drawing, which is to be regarded as merely illustrative:

Fig. 1 is a plan view of an automobile and a coupled house trailer incorporating the presently preferred embodiment of the invention;

Fig. 2 is a side elevation of one of the stabilizer units, viewed as indicated by the arrow 2 in Fig. 1;

Fig. 3 is a horizontal section through the detent means of the unit taken as indicated by the line 3—3 of Fig. 2;

Fig. 4 is a fragmentary plan view similar to Fig. 1 showing the automobile and house trailer negotiating a curve; and Fig. 5 is an end elevation of a modified form of the detent means.

In the drawing, which illustrates the presently preferred embodiment of the invention, Fig. 1 shows an automobile 10 towing a house trailer 12 by means of a conventional trailer hitch of well known construction generally that is designated by numeral 14. The trailer hitch 14 permits relative pivotal movement between the automobile and the house trailer about the axis of a pivot member 15.

The preferred practice of the invention employs two stabilizer units, namely, a right hand unit, designated by the letter R, spaced laterally from the trailer hitch 14 toward the right hand side of the two vehicles, and a left hand stabilizer unit, generally designated by the letter L, spaced laterally from the trailer hitch towards the left hand side of the two vehicles. Since each of these stabilizer units has a stabilizing effect independently of the other, it is conceivable that one of the units may be omitted in some practices of the invention.

As shown in Fig. 2, each of the stabilizer units R and L includes an elongated member or stabilizer rod 20 which, in this instance, is of round cross-sectional configuration. One end of the stabilizer rod 20 is pivotally connected to one of the two vehicles and the other end of the rod slidingly extends through a detent means or detent assembly that is generally designated by numeral 22. This detent assembly is pivotally connected to the other vehicle. In the particular embodiment of the invention illustrated by the drawing, the forward end of the stabilizer rod 20 is pivotally connected to the frame of the automobile 10, the stabilizer rod extending rearwardly through the detent assembly 22 and the detent assembly being pivotally connected to the trailer 12.

As shown in Fig. 2, the forward end of the stabilizer rod 20 is adjustably but rigidly connected to an angular bracket 24 by a pair of nuts 25 and the bracket is pivotally connected to the frame of the automobile 10 by a pivot bolt 26. A coiled spring 28 surrounds the pivot bolt 26 in compression between the angular bracket 24 and the automobile frame. It is apparent that the forward end of the stabilizer rod 20 is free to pivot about the pivot bolt 26 and that the pivot bolt may be removed to disconnect the stabilizer rod from the automobile. It is also apparent that the two nuts 25 may be adjusted to vary the longitudinal position of the the stabilizer rod 20.

The detent assembly 22 through which the other end of the stabilizer rod 20 extends has an elongated housing 34 of rectangular configuration and this housing carries a pivot stud 35 that extends rigidly upward therefrom for pivotal connection to the trailer. In the arrangement shown in Fig. 2, the pivot stud 35 extends upward through an aperture in an angular bracket 36 that is rigidly mounted on the underside of the trailer. The pivot stud 35 is retained in the angular bracket 36 by means of a nut 38 and a cotter pin 40. Preferably, a coiled spring 42 surrounds the pivot stud 35 in compression between the detent assembly housing 34 and the angular bracket 36. It is apparent that this arrangement permits the stabilizer rod 20 to pivot about the axis of the pivot stud 35 for swinging movement relative to the trailer in addition to swinging movement relative to the automobile 10 about the pivot bolt 26.

It is contemplated that the stabilizer rod will be peripherally recessed in an appropriate manner for cooperation with the detent assembly 22. In this particular embodiment of the invention the detent assembly 22 incorporates four detent elements in the form of four steel balls 44, 45, 46 and 47, there being two steel balls on each side of the assembly. Accordingly the stabilizer rod 20 has two spherically curved recesses 50 and 51 on one side to releasably seat the balls 44 and 45 and has two similar recesses 52 and 53 on its other side to seat the two steel balls 46 and 47 when the house trailer 12 is in normal longitudinal alignment with the automobile 10.

Each of these steel balls 44, 45, 46 and 47 of the detent assembly 22 is continuously pressed inward towards the periphery of the stabilizer rod 20 by a corresponding coiled spring 55. In the construction shown, each of the coiled springs 55 is confined by a corresponding pipe nipple 56 that is closed by an end wall 58 at its outer end and is threaded into the detent assembly housing 24 in a removable manner. Each of the coiled springs 55 is in compression between the corresponding steel ball and the corresponding end wall 58.

Preferably, the detent housing 34 is slightly larger in cross-sectional dimension than the stabilizer rod 20 and the stabilizer rod is centralized in the housing by suitable guide means. For this purpose, the forward end of the detent assembly housing 24 incorporates a guide bushing 60 that slidingly embraces the stabilizer rod 20 and the rear end of the housing incorporates a second similar guide bushing 62. It has been found that incorporation of a third guide means 64 in the housing structure midway between the two guide bushings is helpful in facilitating assembly, since the lateral thrust exerted by the various springs 55 may make it difficult to thread the stabilizer rod through the housing.

The preferred practice of the invention is further characterized by the addition of stop means for cooperation with the detent assembly 22 in the event that the trailer hitch 14 should fail. For this purpose the rear end of the stabilizer rod 20 is provided with an enlargement 66. The stop enlargement 66 is spaced rearwardly from the detent assembly 22 by sufficient distance to avoid contact with the detent assembly at the extreme forward position of the stabilizer rod when the vehicle is being towed around a sharp curve. If the trailer hitch 14 should fail, however, the stabilizer rod 20 would be drawn forward to place the stop enlargement 66 in abutment with the rear end of the detent assembly 22 whereupon the stabilizer rod would function as a draw bar for keeping the trailer coupled to the automobile.

The manner in which the invention serves its purpose to stabilize the travel of a trailer may be readily understood from the foregoing description. The detent means comprising the four spring-pressed steel balls provides adequate yielding resistance to relative longitudinal movement of the two stabilizer bars 20 to withstand the normal range of random forces that tend to make the trailer oscillate out of longitudinal alignment with the automobile on straight roads. When the automobile starts to negotiate a curve, however, the resultant forces applied to the two stabilizer bars 20 in opposite longitudinal directions causes one of the stabilizer bars to move forward out of engagement with its detent means and causes the other stabilizer rod to move rearward out of engagement with its detent means. When recesses of the two stabilizer bars 20 are completely free from the steel balls of the two corresponding detent means, the two detent means only lightly resist relative movements of the two stabilizer rods, the resistance being of such low magnitude that it does not interfere with the proper tracking of the trailer on a curve. At such a time, however, some frictional resistance is applied by the steel balls and this minor resistance is desirable.

One advantage of this particular embodiment of the invention is that the described detent means for each of the two stabilizer rods actually makes detent engagement with the rod at three different longitudinal positions of the rod. This fact may be understood by reference to Fig. 3 which shows the stabilizer rod 20 in its normal position with the four steel balls yieldingly seated in the four peripheral recesses. It is apparent that if the stabilizer rod 20 is moved to the left in Fig. 3, the ball 44 will be unseated from the rod recess 50 but will reseat in the rod recess 51 and, in the same manner, the steel ball 46 will unseat from the recess 52 and reseat in the recess 53. Since only two of the four steel balls seat at this time the resistance of the detent means to longitudinal movement of the stabilizer rod 20 is approximately half of the normal resistance at the normal position of the stabilizer rod. In the same manner, longitudinal shift of the stabilizer rod 20 to the right from the normal detent position shown in Fig. 3 will cause the steel ball 45 to shift from its normal seat in rod recess 51 into engagement with the rod recess 50 and will cause the steel ball 47 to shift from the rod recess 53 to the rod recess 52.

These additional positions of engagement of the detent means 22 with each of the two stabilizer rods 20 have a secondary damping effect in that they tend to limit the extent to which the trailer sways on those occasions when an exceptional lateral force overcomes the resistance of the two detent means at their normal positions of engagement. It is to be borne in mind that when a trailer oscillates back and forth from its normal position of longitudinal alignment with the automobile, a relatively great resistance is required to arrest the oscillation at the mid-point of the oscillation but much less resistance is required to arrest the oscillation on either side of the mid-point.

If it is desired to avoid the described secondary damping effect by arranging each of the detent means 22 to engage the corresponding stabilizer rod 20 at only one longitudinal position of the stabilizer rod, it is merely necessary to avoid longitudinal alignment among the stabilizer rod recesses. Fig. 5 for example shows how the four nipples 56a may be positioned in four different quadrants with the stabilizer rod recesses in the corresponding four quadrants. In such an arrangement only one stabilizer rod recess is in longitudinal alignment with each of the four steel balls.

My description in specific detail of a selected embodiment of the invention and of a modification thereof will suggest various changes, substitutions and other departures from my disclosure within the spirit and scope of the appended claims.

I claim as my invention:

1. Means to stabilize a trailer vehicle having a central hitch connection with an automotive vehicle, said stabilizing means including: an elongated member spaced laterally from said hitch connection and having at least one peripheral recess; a first means pivotally connecting one end of said member with one of said two vehicles; means slidingly engaging said member for sliding movement relative thereto longitudinally thereof; a second means pivotally connecting said sliding means with the other of said two vehicles; detent means carried by said sliding means normally in yielding engagement with said peripheral recess with the two vehicles in normal longitudinal alignment thereby offering relatively high yielding resistance to relative movement between the member and the slide means when the two vehicles are in normal longitudinal alignment and relatively low resistance when the two vehicles are out of normal longitudinal alignment with each other.

2. A combination as set forth in claim 1, in which said longitudinal member has a plurality of longitudinally spaced peripheral recesses and said slide means carries a corresponding plurality of detent elements for yielding engagement with said recesses when the two vehicles are in normal longitudinal alignment.

3. A combination as set forth in claim 2, in which two of said recesses and two corresponding detent elements are in longitudinal alignment whereby both detents engage the two recesses when the two vehicles are in normal longitudinal alignment for maximum resistance to relative movement between said member and said slide means, and one of said detent elements engages one of said recesses for lesser resistance to the relative movement when the two vehicles are slightly out of normal longitudinal alignment in either lateral direction.

4. A combination as set forth in claim 1, in which said detent means includes a ball member and spring means to urge the ball member against the periphery of said elongated member for engagement with said peripheral recess.

5. A combination as set forth in claim 1, in which said first pivotally connecting means releasably connects the forward end of said member with said automotive vehicle.

6. A combination as set forth in claim 1, which includes a stop on said elongated member to engage said slide means at a limit position of the member relative to the slide means, thereby to couple the two vehicles together in the event said hitch connection fails.

7. Means to stabilize a trailer vehicle as set forth in claim 1, which includes two stabilizer assemblies, one on each side of said hitch connection, each of said assemblies including an elongated member, cooperating slide means, detent means and first and second pivotally connecting means.

8. Means to stabilize a trailer vehicle having a central hitch connection with an automotive vehicle, said stabilizing means including: two elongated members on the opposite sides, respectively, of said hitch connection, each of said members having a detent recess therein; means pivotally connecting one end of each of said members with one of said vehicles; and two detent means carried by the other of said vehicles to yieldingly engage said detent recesses respectively when the two vehicles are in normal longitudinal alignment to yieldingly resist initial movement only of the two vehicles out of normal longitudinal alignment.

References Cited in the file of this patent

UNITED STATES PATENTS 2,225,130   Otto et al. _____ Dec. 17, 1940

FOREIGN PATENTS 705,800   Germany _____ May 10, 1941